March 13, 1956  F. MASSA  2,738,173
REDUCTION OF FRICTION BETWEEN A FLUID AND THE WALL
OF A CONDUIT THROUGH WHICH THE FLUID IS PASSING
Filed April 9, 1952  2 Sheets-Sheet 1

Frank Massa
Inventor

March 13, 1956  F. MASSA  2,738,173
REDUCTION OF FRICTION BETWEEN A FLUID AND THE WALL
OF A CONDUIT THROUGH WHICH THE FLUID IS PASSING
Filed April 9, 1952  2 Sheets-Sheet 2

Frank Massa  Inventor

United States Patent Office

2,738,173
Patented Mar. 13, 1956

2,738,173

REDUCTION OF FRICTION BETWEEN A FLUID AND THE WALL OF A CONDUIT THROUGH WHICH THE FLUID IS PASSING

Frank Massa, Braintree, Mass.

Application April 9, 1952, Serial No. 281,432

6 Claims. (Cl. 259—2)

This invention is a continuation in part of my co-pending application Serial No. 256,735, filed November 16, 1951, and it is concerned with the reduction of friction between a fluid and the walls of a conduit through which the fluid is attempting to flow. My present invention is of particular advantage when a fluid is required to flow through a restricted opening such as a small orifice or slit and when it is necessary to maintain uniform flow through such a small orifice.

It is well-known that if a liquid such as paint, for example, is to be applied in the form of a fine stream by being run through a tiny orifice having a diameter of a few thousandths of an inch that the rate of flow will not be uniform and the degree of non-uniformity will increase as the diameter of the orifice becomes smaller and smaller. The irregularity is apparently the result of a variable film thickness that is built up on the wall of the conduit or in the vicinity of the orifice opening which causes a variation in the effective size of the passageway. A small variation in film thickness will naturally cause a very large change in the area of the opening if the size of the orifice or passageway is very small.

For applications requiring uniform flow of a fluid through a small opening, I have found it possible to achieve this objective by generating high-frequency compressional waves in at least a portion of the wall which forms the restricted passage through which the fluid flows. I have found an enormous reduction in resistance to flow when these high-frequency vibrations were impressed on the wall portion of the conduit carrying the fluid. For a narrow slit having a separation of the order of .001" to .002", I found that there was a change in rate of flow of over 100 to 1 during a few minutes running of ordinary house paint through the slit under a constant pressure head. By applying high-frequency vibrations in the vicinity of the slit, the rate of flow was considerably increased and became relatively constant over long periods of time. I found that the frequency of vibration was not critical but that if frequencies in the ultrasonic range in excess of 15,000 cycles per second were employed, the problem of noise generation by the compressional wave generator was easily eliminated.

When the high-frequency compressional waves are introduced into the passageway through which a fluid is flowing, the resistance between the wall of the tube and the fluid is decreased and in addition the presence of these high-frequency vibrations produce a cleaning action on the inner surface of the tubular passageway so that any coating of the surface that would tend to be built up in the absence of the applied vibrations is prevented from forming under the influence of the applied compressional waves. The tubular member or conduit through which the fluid is flowing may be of circular cross-section, rectangular cross-section, or of any other shape and the improved conditions will be obtained in each instance when the wall surface of the tube is supplied with high-frequency compressional waves. I have found this improvement to be realized for passageways of constant cross-sections as well as for tapered cross-sectional areas. The greatest improvements were obtained when the smallest dimension of the opening was less than 1/64 inch when liquids having consistencies of the order of ordinary house oil paints were being made to flow.

An object of my invention is to greatly reduce the resistance to flow of a fluid through a passageway by introducing high-frequency compressional waves into the wall of the passage.

Another object of my invention is to greatly reduce the variation in the rate of flow of a fluid through a restricted opening by introducing high-frequency compressional waves into the wall of the opening.

A further object of my invention is to employ an electromechanical transducer element as the wall of a passageway through which a fluid may flow in order that mechanical vibrations may be generated at the wall surface so that the resistance to flow of the fluid through the passageway will be reduced.

A still further object of my invention is to prevent the formation of surface deposits on the wall surfaces of a conduit through which a fluid is flowing by impressing high-frequency compressional waves into the wall of the conduit.

The novel features that I consider characteristic of my invention are set forth with particularity in the appended claims. The invention, itself, however, both as to its organization and method of operation, as well as additional objects and advantages thereof, will best be understood from the following description of several embodiments thereof, when read in connection with the accompanying drawings, in which—

Figure 1:
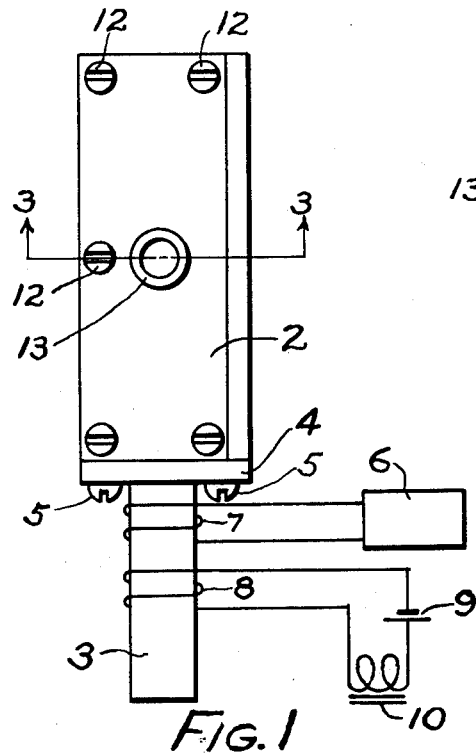
Fig. 1 is a partially schematic view showing one form of my invention.
Figure 2:
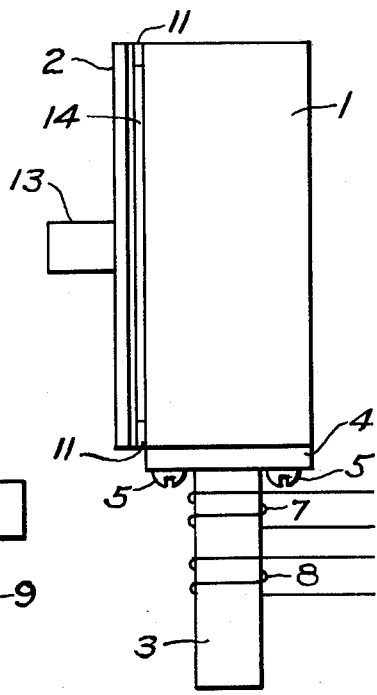
Fig. 2 is a side view of the same structure shown in Fig. 1.
Figure 3:
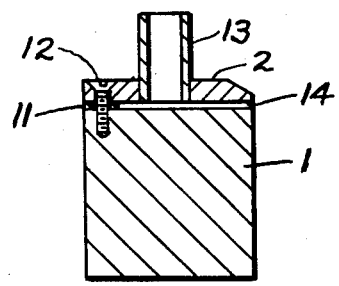
Fig. 3 is a section taken along the line 3—3 of Fig. 1.

Referring more particularly to Figs. 1, 2, and 3, the reference character 1 represents a solid bar to which is assembled a plate 2 by means of the screws 12. A thin gasket 11 is placed between the base 1 and the plate 2 to form a thin slit opening 14 along one edge of the assembly. A piece of tubing 13 is shown attached to the top plate 2 through which a fluid may be admitted into the space left by the gasket to be discharged through the opening 14. When running a liquid such as ordinary house paint through such an assembly in which the spacing for the opening 14 was less than 1/64 inch, I found a considerable variation in the rate of flow, which amounted to more than 100 to 1, when the opening was as small as one or two thousandths of an inch. I also found it possible to very greatly reduce this variation in flow and to maintain a fairly constant relatively high rate of flow through these tiny slits by introducing high-frequency compressional waves in the vicinity of the slit. One method by which these vibrations may be introduced is by employing a magnetostriction oscillator 3 as a high-frequency compressional wave generator which is bonded by silver solder or other suitable means to the base plate 4. Both the surface of the face plate 4 and the end surface of the member 1 to which it is attached are ground flat to secure intimate acoustic coupling of the two parts. I have found it desirable to employ a thin film of grease between the two surfaces to improve the intimacy of contact before attaching plate 4 to the member 1 by means of the screws 5. The magnetostriction oscillator 3 may be any one of several designs well-known in the art. In this case, I have shown the same structure employed in my above-mentioned co-pending application which consists of a stack of thin laminations of magnetostrictive material such as nickel, but the compressional wave generator could be of any other well-known form. An electronic power supply 6 is indicated schematically in Fig. 1 for supplying alternating current to the coil of wire 7 which surrounds the magnetostriction oscillator 3. A second coil 8 also surrounds the oscillator 3 and is connected to the battery 9 to serve as a D.-C. polarizing source for the nickel stack 3. The necessity for the D.-C. current as provided by coil 8 is to establish a magnetic bias in the nickel to cause it to operate at its maximum efficiency. The necessity for using a D.-C. magnetic bias is very well-known in the art and does not form a part of this invention. The illustration is given to show one of several generally-available methods for producing high-frequency oscillations. A choke 10 is placed in series with the battery 9 and coil 8 to prevent the D.-C. polarizing circuit from taking A.-C. power from coil 7. The use of the choke 10 is to introduce a high impedance in the D.-C. circuit at the high frequency of operation. If the choke were not employed, coil 8 would act as a short-circuited secondary of a transformer of which coil 7 would be the primary through which high-frequency alternating current is supplied by the source 6. The presence of the choke causes the impedance in the D.-C. circuit to be very high at the high alternating frequency supplied by the generator 6 and, in this way, coil 8 does not draw alternating power from coil 7. This method of exciting a magnetostriction oscillator is well-known in the art and does not form part of my invention. When the magnetostriction oscillator 3 is electrically excited, high-frequency compressional waves are generated in the nickel stack and are transmitted into the member 1 by virtue of the intimate contact between the face plate 4 and the end surface of the body 1 to which the face plate is attached. When these high-frequency compressional waves are established, I have found that the rate of flow of the liquid through the slit is increased and maintained at a relatively uniform rate over long periods of time. I also found that the frequency of the compressional waves is not critical but it is desirable to have them in the ultrasonic frequency range above 15,000 cycles per second so that no disturbing sound is caused by the compressional wave generator. I found that frequencies as low as 1000 cycles per second are satisfactory for reducing static friction but for frequencies in the audible range, however, audible sound is radiated by the structure which in some cases may be an objectionable nuisance.

Figure 5:
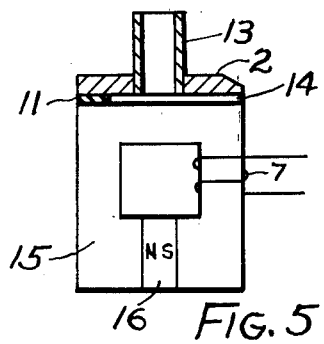
Fig. 5 is a section taken along the line 5—5 of Fig. 4.
Figure 4:
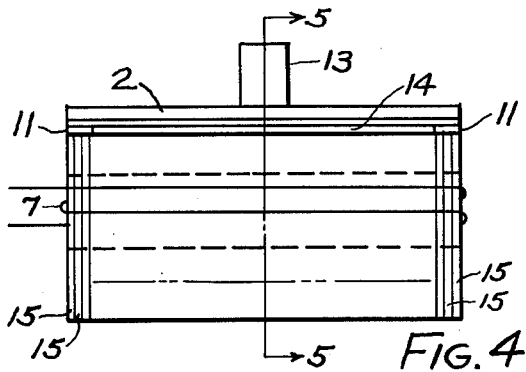
Fig. 4 is a partially schematic view showing another form of my invention.

Figs. 4 and 5 show another embodiment of my invention in which I employ a magnetostriction assembly as one wall of the narrow slit. The top plate 2 with the inlet 13 are the same as used in Figs. 1, 2, and 3, as is also the thin gasket 11. Part 1 of Figs. 1, 2, and 3 is now replaced by a stack of magnetostrictive laminations 15 such as nickel which are bonded together by means of a suitable cement. A permanent magnet 16 is employed, as shown, to provide the D.-C. polarizing flux through the nickel stack. The coil 7 is wound, as indicated, and when a high-frequency electric power source is connected to it, high-frequency mechanical oscillations of the nickel stack will result. In this arrangement, a wall of the passageway which terminates in the slit 14 is formed by the assembled magnetostriction laminations 15 and the vibrations are thereby generated directly into the passageway. The operation of the structure shown in Figs. 4 and 5 results in the same improvements to fluid flow as described in connection with the structure shown in Figs. 1, 2, and 3.

Figure 6:
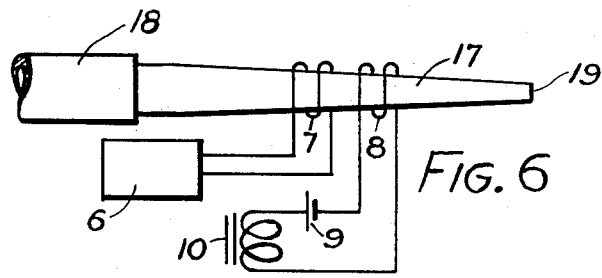
Fig. 6 is a partially schematic view showing still another form of my invention.
Figure 7:
Fig. 7 is an end view of Fig. 6.

Figs. 6 and 7 illustrate another structure for achieving my objective. In this case, the entire tubular member 17 which forms the fluid conduit is magnetostrictive and may be made from a piece of nickel tubing. The coils of wire 7 and 8 in combination with the alternating electric power source 6, battery 9, and choke 10 perform the identical functions as the corresponding numbered parts in Figs. 1, 2, and 3. When a liquid is admitted through the tubular member 17 by means of the rubber tube 18, the rate of flow of the liquid through the tiny orifice 19 is increased and maintained at a uniform rate when the tubular member 17 is set in magnetostrictive vibration. In Fig. 6, the tubular member 17 is shown tapered throughout its length. The structure would work equally well if the length of the tube were of uniform diameter or if the main length of the tube were of uniform diameter and only the tip portion were reduced in size to form the small orifice 19. Although a tubular magnetostrictive element has been described, the same improved results could be achieved by making the element of any other transducer material such as a tube of barium titanate which is piezo-electric and which may be set into vibration by applying high-frequency voltages between the inner and outer wall surfaces of the tube.

Figure 8:
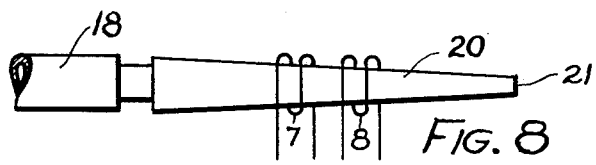
Fig. 8 is a partially schematic view showing another form of my invention.
Figure 9:
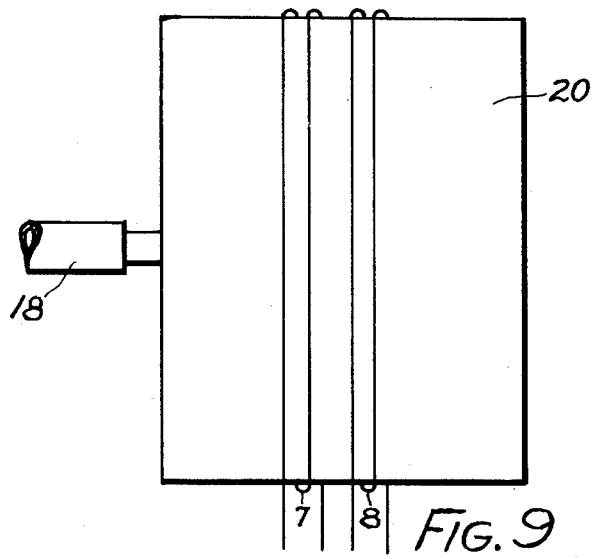
Fig. 9 is a plan view of the structure shown in Fig. 8.
Figure 10:
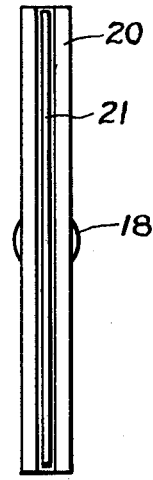
Fig. 10 is an end view of the structure shown in Fig. 9.

Figs. 8, 9, and 10 illustrate still another form of my invention in which the conduit or passageway is made from a material which is itself the transducer element. In this case, the tubular element 20 is of rectangular cross-section and is in the form of a thin flat passageway which provides a narrow slit 21 at one end. This element is made of magnetostrictive material such as nickel sheet, for example, and if the polarizing and exciting coils 7 and 8 are wound around element 20 and connected to the sources of A.-C. power 6 and D.-C. power 9, the same as was done in Fig. 6, the structure 20 will excite high-frequency vibrations similar to what was described for the circular tubular element 17 in Fig. 6 with the same advantages resulting in the flow of fluids therethrough.

Although I have only shown a few examples of compressional wave generators, it is, of course, possible to employ any of numerous other types of generators, some of which are described and illustrated in my above-mentioned co-pending application and others which may include piezo-electric or electro-magnetic compressional wave generators which are also well-known in the art.

Although I have only mentioned a few applications of my invention to illustrate my new method for reducing friction between a fluid and the walls of a passageway through which it flows, it will be obvious to those skilled in the art that numerous other applications may be made for my invention, and I, therefore, desire that my invention shall not be limited except insofar as is made necessary by the prior art and by the spirit of the appended claims.

I claim as my invention:

1. In combination, a conduit, means for admitting a fluid into said conduit, means for discharging a fluid from said conduit into a thin film, said discharge means including a restricted opening having at least one of its dimensions smaller than 1/64 inch, and compressional wave generating means for imparting vibration energy directly into at least one wall of said restricted opening.

2. In combination, a conduit, means for admitting a fluid into said conduit, means for discharging a fluid from said conduit into a thin film, said discharge means including a restricted opening having at least one of its dimensions smaller than 1/64 inch, and compressional wave generating means for imparting vibrational energy directly into at least one wall of said restricted opening, the frequency of said vibrational energy lying in the frequency region greater than 15,000 cycles per second.

3. In combination, a conduit, means for admitting a fluid into said conduit, a discharge outlet associated with said conduit, said discharge outlet comprising a thin slit having its narrow dimension less than 1/64 inch, and compressional wave generating means associated directly with at least one wall of said slit.

4. In combination, a conduit, means for admitting a fluid into said conduit, a discharge outlet associated with said conduit, said discharge outlet comprising a thin slit having its narrow dimension less than 1/64 inch, and compressional wave generating means associated directly with at least one wall of said slit, the frequency of vibration of said compressional wave generating means lying in the region above 15,000 cycles per second.

5. In combination, a conduit, means for admitting a fluid into said conduit, means for discharging a fluid from said conduit into a thin film, said discharge means including a restricted passageway having at least one of its dimensions less than 1/64 inch, said passageway characterized in that at least part of its wall structure is fabricated from magnetostrictive material, and electrical means associated with said magnetostrictive material to induce vibrations into said material.

6. In combination, a conduit, means for admitting a fluid into said conduit, means for discharging a fluid from said conduit into a thin film, said discharge means including a restricted passageway having at least one of its dimensions less than 1/64 inch, said passageway characterized in that at least part of its wall structure is fabricated from magnetostrictive material, and electrical means associated with said magnetostrictive material to induce vibrations into said material, the frequency of vibration lying in the range above 15,000 cycles per second.

References Cited in the file of this patent

UNITED STATES PATENTS

| | | |
|---|---|---|
| 1,923,678 | Lowell | Aug. 22, 1933 |
| 2,174,348 | Damond | Sept. 26, 1939 |
| 2,185,540 | Cady | Jan. 2, 1940 |
| 2,512,743 | Hansell | June 27, 1950 |
| 2,566,984 | Firth | Sept. 4, 1951 |
| 2,585,103 | Fitzgerald | Feb. 12, 1952 |